(12) United States Patent
Reddy

(10) Patent No.: US 12,067,300 B1
(45) Date of Patent: Aug. 20, 2024

(54) METHOD AND APPARATUS FOR STORAGE PARTITION MANAGEMENT

(71) Applicant: Dell Products L.P., Round Rock, TX (US)

(72) Inventor: A Ashok Kumar Reddy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 18/296,472

(22) Filed: Apr. 6, 2023

(51) Int. Cl.
*G06F 3/06* (2006.01)

(52) U.S. Cl.
CPC ............ *G06F 3/067* (2013.01); *G06F 3/0604* (2013.01); *G06F 3/0644* (2013.01)

(58) Field of Classification Search
CPC ...... G06F 3/067; G06F 3/0604; G06F 3/0644; G06F 1/1658
USPC .......................................................... 711/154
See application file for complete search history.

(56) References Cited

U.S. PATENT DOCUMENTS

| | | | | |
|---|---|---|---|---|
| 2008/0120515 | A1* | 5/2008 | Ritz | G06F 11/2043 713/601 |
| 2009/0183169 | A1* | 7/2009 | Chiang | G06F 9/5061 718/107 |
| 2021/0173812 | A1* | 6/2021 | Garaga | G06F 16/13 |

* cited by examiner

*Primary Examiner* — Hashem Farrokh
(74) *Attorney, Agent, or Firm* — Daly, Crowley, Mofford & Durkee, LLP

(57) ABSTRACT

A method comprising: receiving, at a computing node, an instruction to mount an unspecified storage partition, the instruction including a first parameter and a second parameter, the first parameter being a partition set identifier and the second parameter being a directory path; retrieving, by the computing node, an identifier of the computing node; combining the partition set identifier with the identifier of the computing node to derive a partition identifier, the partition identifier corresponding to a given storage partition; mounting the given storage partition at the computing node, the given storage partition being mounted by using the derived partition identifier, the given storage partition being mounted at a mountpoint that is identified by the directory path.

20 Claims, 8 Drawing Sheets host1:~# crm configure ←—602 crm(live/host1)configure# primitive PartitionMnt_RES Filesystem params device="-L CLND_RES"
directory="/clnd_res" fstype bbtrfs options=acl force_clones=true run_fsck=no op monitor interval=30s
timeout=40s op_params depth=20 crm(live/host1)configure# group CRG_RES PartitionMnt_RES ←—606 crm(live/host1)configure# clone CL_RES CRG_RES meta target-role=Started ←—608 crm(live/host1)configure# quit ←—610

There are changes pending. Do you want to commit them (y/n)? Y ←—612
bye host1:~#

FIG. 6

700 instantGuestOSName=$(uname -n) ← 702  704
partitionSetID='echo $OCF_RESKEY|AWK '{PRINT $2}'
pattern="CLND_RES*" ← 706
guest_os_216_1 = "host1"
guest_os_216_2 = "host2"

if[[$partitionSetID=~pattern]] ← 708
Then
    case ($instantGuestOSName in
        $guest_os_216_1)  710
    OCF_RESKEY="-L $d{partitionSetID}1;;
        $guest_os_216_2)  712
    OCF_RESKEY="-L $d{partitionSetID}2;;
    esac
fi

FIG. 7

METHOD AND APPARATUS FOR STORAGE PARTITION MANAGEMENT

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: creating a first storage partition having a first partition identifier, the first partition identifier including a partition set identifier and a first node identifier, the first node identifier being associated with a first node; creating a second storage partition having a second partition identifier, the second partition identifier including the partition set identifier and a second node identifier, the second node identifier being associated with a second node; detecting a type-1 command that includes the partition set identifier; executing the type-1 command based on the partition set identifier, wherein executing the type-1 command includes: (i) transmitting to the first node a first instruction to mount an unspecified partition, the first instruction including the partition set identifier as a parameter, and (ii) transmitting to the second node a second instruction to mount an unspecified partition, the second instruction including the partition set identifier as a parameter; in response to the first instruction, mounting the first storage partition at the first node, the mounting of the first storage partition being performed by: retrieving the first node identifier from a memory of the first node, combining the retrieved first node identifier with the partition set identifier to produce a first resulting identifier, and invoking, by the first node, a type-2 command based on the first resulting identifier; and in response to the second instruction, mounting the second storage partition at the second node, the mounting of the second storage partition being performed by: retrieving the second node identifier from a memory of the second node, combining the retrieved second node identifier with the partition set identifier to produce a second resulting identifier, and invoking, by the second node, the type-2 command based on the second resulting identifier.

According to aspects of the disclosure, a method is provided comprising: receiving, at a computing node, an instruction to mount an unspecified storage partition, the instruction including a first parameter and a second parameter, the first parameter being a partition set identifier and the second parameter being a directory path; retrieving, by the computing node, an identifier of the computing node; combining the partition set identifier with the identifier of the computing node to derive a partition identifier, the partition identifier corresponding to a given storage partition; mounting the given storage partition at the computing node, the given storage partition being mounted by using the derived partition identifier, the given storage partition being mounted at a mountpoint that is identified by the directory path.

According to aspects of the disclosure, a computing device is provided comprising: a memory; and at least one processor that is operatively coupled to the memory, the at least one processor being configured to perform the operations of: receiving an instruction to mount an unspecified storage partition, the instruction including a first parameter and a second parameter, the first parameter being a partition set identifier and the second parameter being a directory path; retrieving, from the memory, an identifier of the computing node; combining the partition set identifier with the identifier of the computing node to derive a partition identifier, the partition identifier corresponding to a given storage partition; mounting the given storage partition, the given storage partition being mounted by using the derived partition identifier, the given storage partition being mounted at a mountpoint that is identified by the directory path.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 6 shows a sequence of commands that implement an example of a process, according to aspects of the disclosure;

FIG. 7 is a diagram of a body of code, according to aspects of the disclosure.

DETAILED DESCRIPTION

Figure 1:
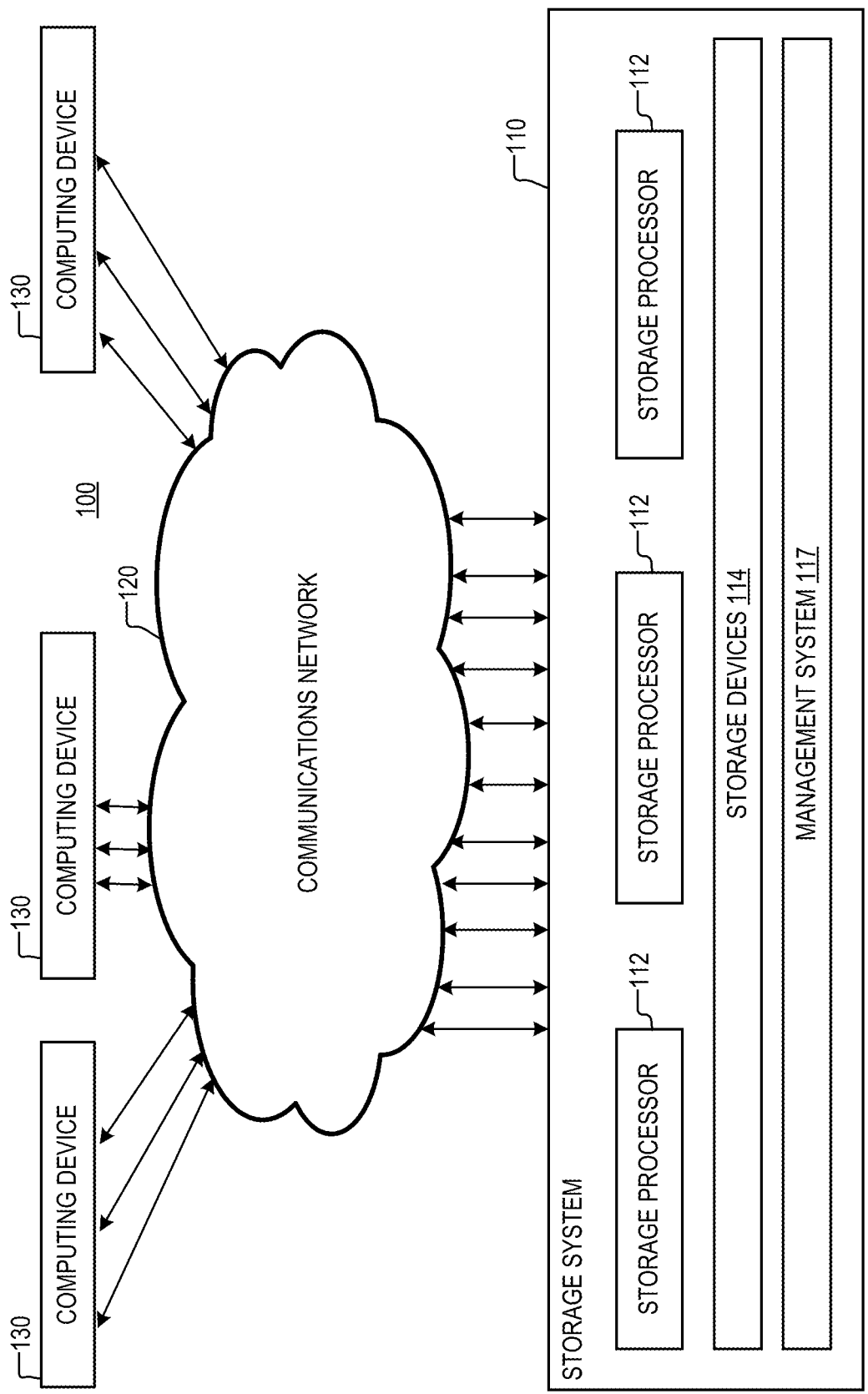
FIG. 1 is a diagram of an example of a system, according to aspects of the disclosure.

FIG. 1 is a diagram of an example of a system 100, according to aspects of the disclosure. As illustrated, the system 100 may include a storage array 110, a communications network 120, and a plurality of computing devices 130. The communications network 120 may include one or more of a fibre channel (FC) network, the Internet, a local area network (LAN), a wide area network (WAN), and/or any other suitable type of network. The storage array 110 may include a storage system, such as DELL/EMC Powermax™, DELL PowerStore™, and/or any other suitable type of storage system. The storage array 110 may include a plurality of storage processors 112, a plurality of storage devices 114, and a management system 117. Each of the storage processors 112 may include a computing device, such as the computing device 800, which is discussed further below with respect to FIG. 8. Each of the storage processors 112 may be configured to receive I/O requests from computing devices 130 and execute the received I/O requests by reading and/or writing data to storage devices 114. Each of the storage devices 114 may include one or more of a solid-state drive (SSD), a hard disk (HD), a non-volatile random-access memory (NVRam) device, a non-volatile memory express (NVMe) device, and/or any other suitable type of storage device. The management system 117 may include a computing device, such as the computing device 800, which is discussed further below with respect to FIG. 8. The management system 117 may be used by a system administrator to modify various configuration settings and/or otherwise manage storage array 110. Each computing device 130 may include a laptop computer, a desktop computer, an Internet-of-things (IOT) device, and/or any other suitable type of computing device that might read or write data to the storage array 110. The storage processors 112 may be connected to the management system via one or more of a fibre channel (FC) network, the Internet, a local area network (LAN), a wide area network (WAN), and/or any other suitable type of network.

Figure 2:
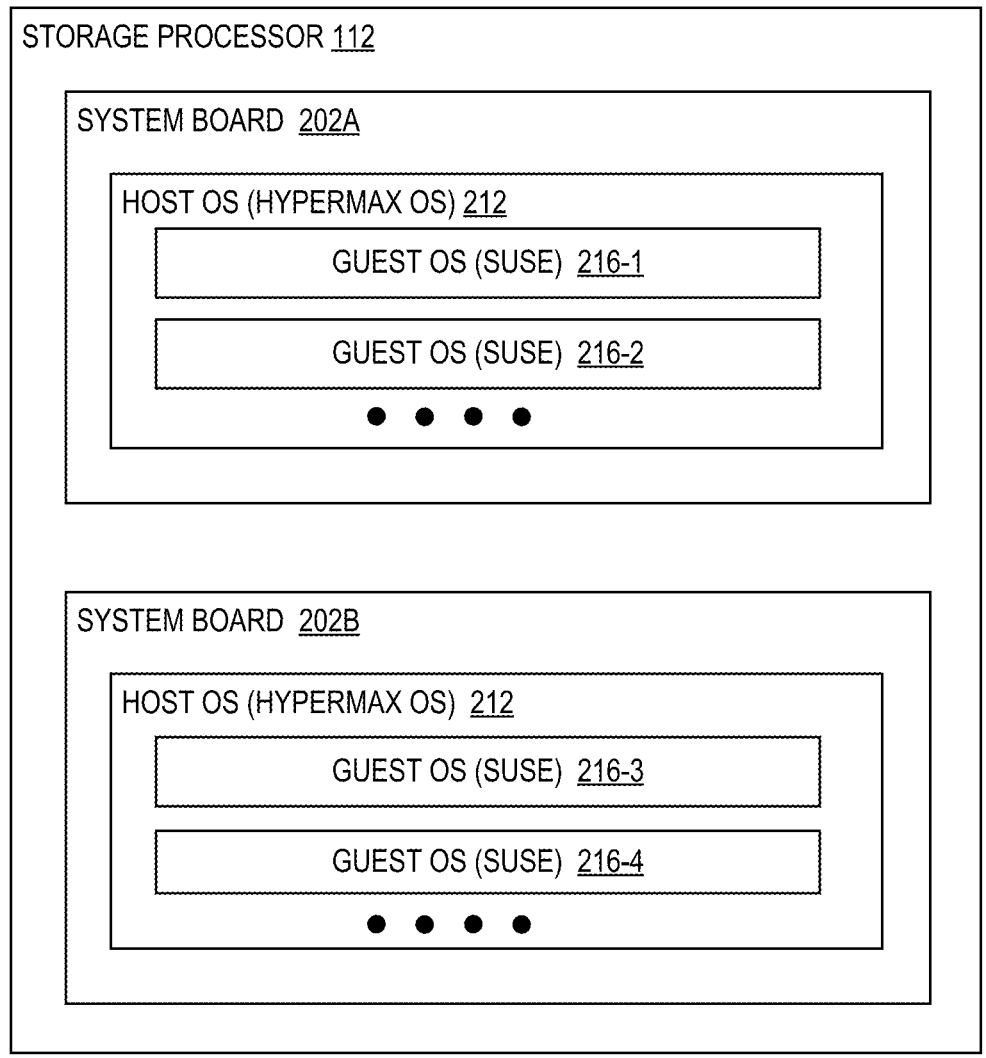
FIG. 2 is a diagram of an example of a storage processor, according to aspects of the disclosure.

FIG. 2 is a diagram of a storage processor 112, according to one possible implementation. In some implementations, each of the storage processors 112 in the storage array 110 may have the configuration that is shown in FIG. 2. As illustrated, the configuration of a storage processor 112, which is shown in FIG. 2 may include system boards 202A and 202B. Each of system boards 202A and 202B may include a motherboard, a processor (e.g., an x86 processor or a MIPS processor, etc.), a memory (e.g., Double Data Random Access Memory (DDRAM), etc.), and/or any other suitable type of component. Each of the system boards 202A and 202B may be configured to execute a respective host operating system (OS). Inside each respective host operating system 212, one or more container threads (not shown) may be executed. Each container thread may spawn a different respective guest operating system instance (i.e., one of the guest operating systems 216) and be responsible for providing virtualized resources to the guest operating system. Each of the container threads may provide various system libraries, binaries, and configuration files that are necessary for the execution of the container thread's respective guest operating system instance. In the present example, each of the guest operating systems 216 is a SUSE Linux™ operating system, however, the present disclosure is not limited to using any specific type of operating system being used. According to the present example, guest operating systems 216-1 and 216-2 are executed in the host operating system 212 which is executed by system board 202A. Furthermore, according to the present example, guest operating systems 216-3 and 216-4 are executed in the host operating system 212 which is executed on system board 202B.

Figure 3:
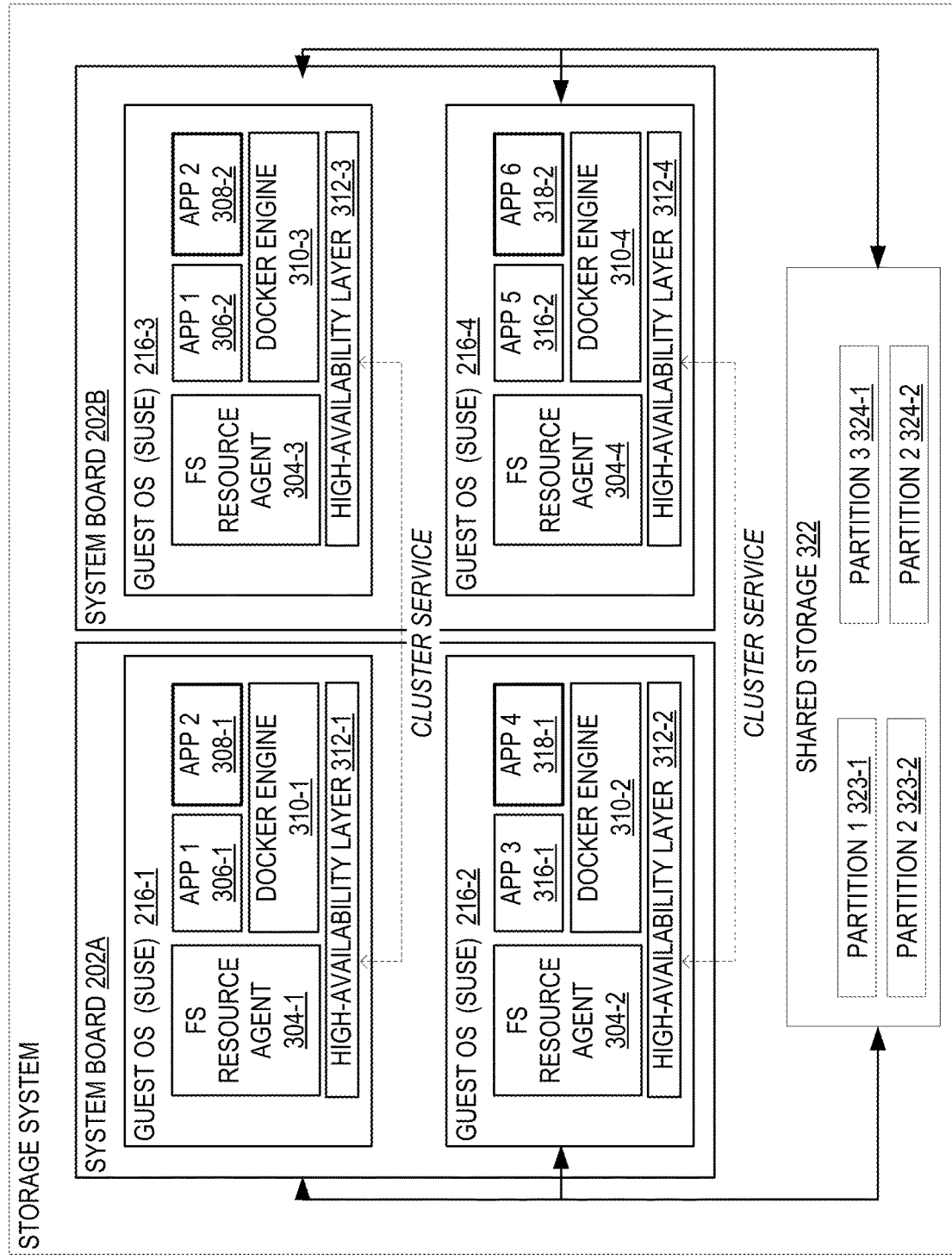
FIG. 3 is a diagram of an example of a storage system, according to aspects of the disclosure.

FIG. 3 is a diagram of an example of the software environment of the storage processor 112, which is shown in FIG. 2, according to aspects of the disclosure.

Guest operating system 216-1 may be arranged to execute a file system resource agent 304-1, an application 306-1, an application 308-1, a docker engine 310-1, and a high-availability (HA) layer 312-1. According to the present example, applications 306-1 and 308-1 may be containerized applications that are executed using the docker engine 310-1. The file system resource agent 304-1 may include software and/or hardware that is configured to mount one or more storage partitions in the guest operating system 216-1. The HA layer 312-1 may provide a high-availability service and application clustering services to the guest operating system 216-1. According to the present example, the HA layer 312-1 is the SUSE Linux Enterprise High Availability Extension. However, the present disclosure is not limited to using any specific type of high-availability layer.

Guest operating system 216-2 may be arranged to execute a file system resource agent 304-2, an application 316-1, an application 318-1, a docker engine 310-2, and a high-availability (HA) layer 312-2. According to the present example, applications 316-1 and 318-1 may be containerized applications that are executed using the docker engine 310-2. The file system resource agent 304-2 may include software and/or hardware that is configured to mount one or more storage partitions in the guest operating system 216-2. The HA layer 312-2 may provide a high-availability service and application clustering services to the guest operating system 216-2. According to the present example, the HA layer 312-2 is the SUSE Linux Enterprise High Availability Extension. However, the present disclosure is not limited to using any specific type of high-availability layer.

Guest operating system 216-3 may be arranged to execute a file system resource agent 304-3, an application 306-2, an application 308-2, a docker engine 310-3, and a high-availability (HA) layer 312-3. According to the present example, applications 306-2 and 308-2 may be containerized applications that are executed using the docker engine 310-3. The file system resource agent 304-3 may include software and/or hardware that is configured to mount one or more storage partitions in the guest operating system 216-3. The HA layer 312-3 may provide a high-availability service and application clustering services to the guest operating system 216-3. According to the present example, the HA layer 312-3 is the SUSE Linux Enterprise High Availability Extension. However, the present disclosure is not limited to using any specific type of high-availability layer.

Guest operating system 216-4 may be arranged to execute a file system resource agent 304-4, an application 316-2, an application 318-2, a docker engine 310-4, and a high-availability (HA) layer 312-4. According to the present example, applications 316-2 and 318-2 may be containerized applications that are executed using the docker engine 310-4. The file system resource agent 304-4 may include software and/or hardware that is configured to mount one or more storage partitions in the guest operating system 216-4. According to the present example, the HA layer 312-4 is the SUSE Linux Enterprise High Availability Extension. However, the present disclosure is not limited to using any specific type of high-availability layer.

A shared storage 322 may include storage partitions 323-1, 323-2, 324-1, and 324-2. According to the present example, storage partition 323-1, 323-2, 324-1, and 324-2 may be implemented by dividing a non-volatile storage device that is part of the storage processor 112 (i.e., a storage device that is situated in the enclosure of storage processor 112). However, alternative implementations are possible in which the storage partitions 323-1, 323-2, 324-1, and 324-2 are implemented on the storage devices 114 and/or any other suitable storage device. Stated succinctly, the present disclosure is not limited to any specific implementation of storage partitions 323-1, 323-2, 324-1, and 324-2.

According to the present example, applications 308-1 and 308-2 are cloned applications. Specifically, applications 308-1 and 308-2 are different instances of the same application. The states of applications 308-1 and 308-2 may be synchronized by HA layers 310-1 and 310-2, respectively. Application 308-1 may be executed in active mode and application 308-2 may be executed in standby mode. When application 308-1 fails or becomes unavailable, a failover may be performed to application 308-2. In some implementations, the failover may be performed by at least one of HA layers 312-1 and 312-3. As a result of the failover, application 308-2 may begin executing in active mode to maintain an uninterrupted availability of the service/function that is provided by applications 308-1 and 308-2. In some implementations, applications 308-1 and 308-2 may perform configuration and management functions or integration functions. However, it will be understood that the present disclosure is not limited to any specific function being performed by applications 308-1 and 308-2.

Storage partition 323-1 may be mounted in guest OS 216-1, and storage partition 323-2 may be mounted in guest OS 216-3. Application 308-1 may use storage partition 323-1 to store internal data that is necessary for the operation of application 308-1 and/or internal data that represents the state of application 308-1. Application 308-2 may use storage partition 323-2 to store internal data that is necessary for the operation of application 308-2 and/or internal data that represents the state of application 308-2.

Having each of applications 308-1 and 308-2 use different storage partitions increases the reliability of applications 308-1 and 308-2. Conventional clustered systems allow only cluster-aware filesystems like NFS, ocfs2, etc. to be able to store the data of all the instances of a cloned resource on a single partition. The single partition must be shared across all the nodes of the cluster to store the data from all the instances. With this method, if there is a single instance that malfunctions and corrupts the data, all the data stored will be lost/corrupted and none of the instances of a cloned resource would be able to work independently. Though one can restore the data from backup, the restoration may involve application downtime, multiple teams' involvement to restore the services, and loss of recent data if not backed up recently. The idea of each application in a cloned resource group using a separate partition will break the reliance on a single storage by all instances of a cloned resource. Though data would not be shared, the cloned applications can store the node-level data on the local devices and thus act independently when there is a disk failure on one of the nodes. In other words, by having each instance of applications 308-1 and 308-2 use a different respective partition, the reliability and/or availability of the service/function provided by applications 308-1 and 308-2 is increased.

Applications 308-1 and 308-2 constitute an example of a cloned resource that has two cloned instances. However, in practice, the same cloned resource may have a much larger number of instances. In this regard, it is desirable for a system administrator to be able to use "bulk" commands to deploy the application instances. The discussion that follows provides an example of a "bulk" mount command that can be used to mount a different respective storage partition on each of a plurality of nodes (e.g., different guest operating systems that are executed on the same computing or different computing devices, etc.). Each of the plurality of nodes may execute a different instance of a cloned resource, and the partition that is mounted on this node with the "bulk" mount command may be used by the respective instance of the cloned resource that is running on that node. At a high level, the "bulk" mount command allows a system administrator to use a single line of code, or a single instruction, to execute multiple mount operations, on multiple nodes (e.g., guest operating systems), for multiple storage portions. As is well-known in the art, the term storage partition refers to a unit that may encompass a portion of the capacity of a storage device or the entire capacity. Under the nomenclature of the present disclosure, the "bulk" mount command is referred to as a "clone command".

Figure 4:
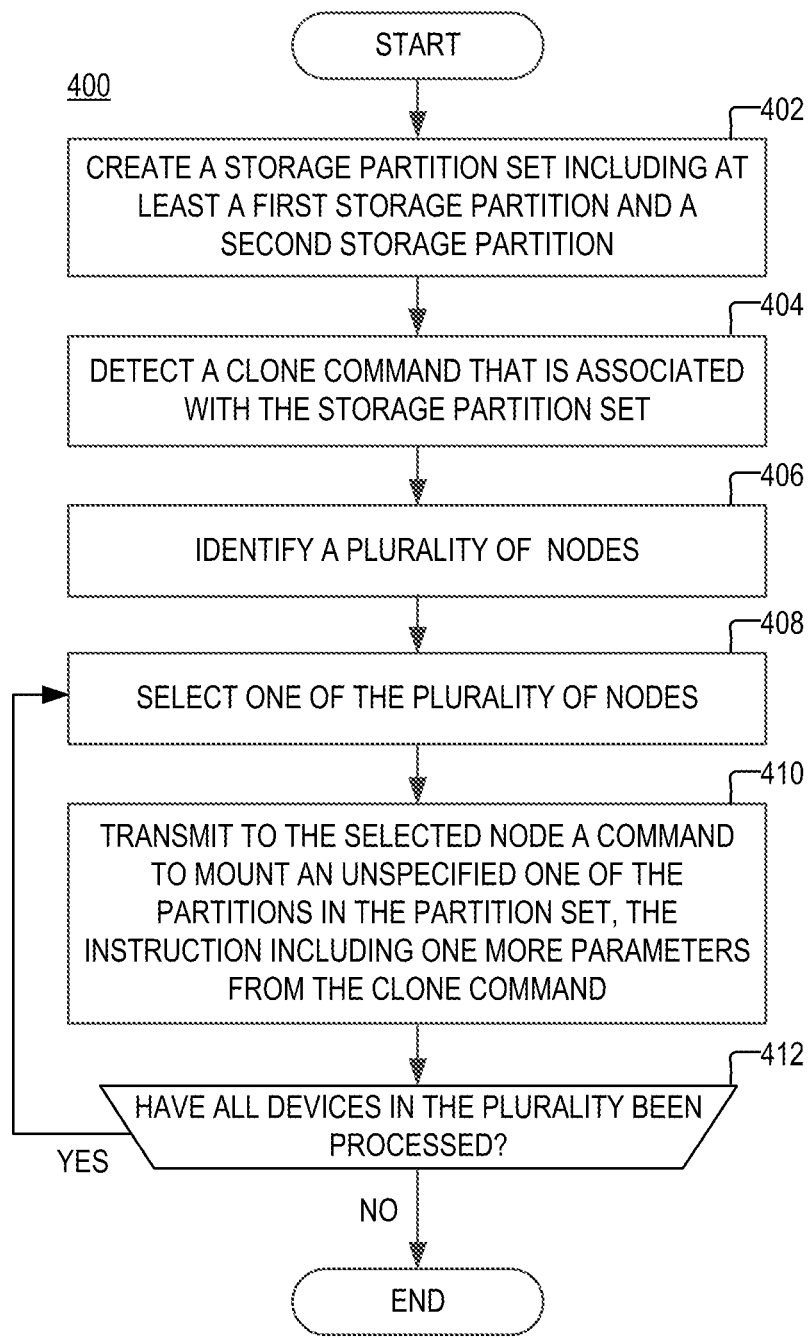
FIG. 4 is a flowchart of an example of a process, according to aspects of the disclosure.

FIG. 4 is a flowchart of an example of a process 400, according to aspects of the disclosure. According to the present example, the process 400 is performed by the management system 117. However, the present disclosure is not limited to any specific entity performing the process 400.

At step 402, a set of storage partitions is created. According to the present example, the set of storage partitions includes storage partitions 323-1 and 323-2. According to the present example, the set of storage partitions is created by the management system 117. However, the present disclosure is not limited to any specific way for creating the storage partitions 323-1 and 323-2. Each of the created partitions may have an identifier that includes a partition set identifier and a node identifier. According to the present example, each of the partition identifiers is a concatenation of a partition set identifier and a node identifier. However, the present disclosure is not limited to any specific method for encoding the partition set identifier and a node identifier into a partition identifier. Specifically, in the present example, the partition identifier for storage partition 323-1 is "CLND_RES1", with "CLND_RES" being the partition set identifier and "1" being the node identifier. Furthermore, in the present example, the partition identifier for storage partition 323-2 is "CLND_RES2", with "CLND_RES" being the partition set identifier and "2" being the node identifier. In the present example, the node identifiers of guest OS systems 216-1 and 216-3 are numerical indices that are assigned to the guest operating systems, however alternative implementations are possible in which another type of node identifier is used, such as the host names of the guest operating systems, etc. The present disclosure is not limited to using any specific type of node identifier.

At step 404, the management system 117 detects a clone command that is associated with the storage partition set. According to the present example, the clone command is input into a shell of the management system 117. However, alternative implementations are possible in which the clone command is part of an automated script. According to the present example, the clone command includes, as a parameter, the partition set identifier, but it does not include the identifiers of different storage parathion in the partition set. Specifically, the clone command includes the partition identifier "CLND_RES", but it does not include the individual identifiers of any of partitions 323-1 and 323-2, which entirely constitute the set CLND_RES in this example.

At step 406, a plurality of nodes is identified by the management system 117. According to the present example, the plurality of nodes includes the guest operating systems 216-1 and 216-3. As used throughout the disclosure, the term "node" shall refer to one of a "computing device" and an "operating system that is executed on the computing device". In one respect, identifying the nodes may include identifying a list (or data structure) that includes identifiers of nodes that are associated with the clone command (or a list of nodes that are used to run a set of cloned instances of the same application). In some implementations, the list may be retrieved based on a list identifier that is received as one of the parameters of the cloned command. However, the present disclosure is not limited to any specific method for identifying the nodes and/or the list.

At step 408, the management system 117 selects one of the plurality of nodes. In one example, the plurality of nodes may include as many nodes as there are partitions in the set created at step 402. However, the present disclosure is not limited thereto.

At step 410, the management system 117, transmits to the selected node an instruction to mount an unspecified partition. According to the present example, the instruction includes a mount command, and the set of parameters that is submitted with the mount command includes a partition set identifier, but it does not include a storage partition identifier. According to the present example, the mount command includes the partition set identifier for the set of partitions that is created at step 402. It will be recalled that the partition set identifier is CLND_RES.

At step 412, a determination is made if all of the nodes in the plurality (identified at step 406) have been processed. If all nodes have been processed, the process 400 ends. Otherwise, the process 400 returns to step 408, and another one of the nodes is selected, which has not been selected during a previous iteration of steps 408-412.

Figure 5:
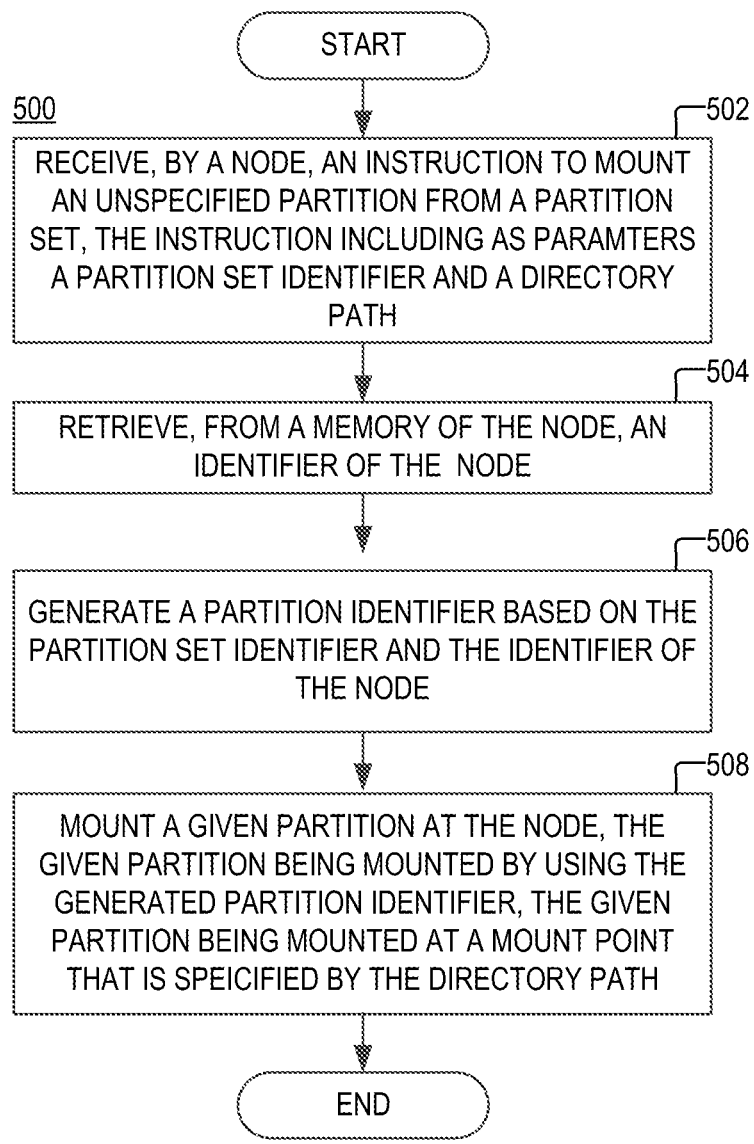
FIG. 5 is a flowchart of an example of a process, according to aspects of the disclosure.

FIG. 5 is a flowchart of an example of a process 500, according to aspects of the disclosure. According to the present example, the process 500 is performed by the guest operating system 216-1. Specifically, according to the present example, the process 500 is performed by the file system resource agent 304-1, which is executed in the guest operating system 216-1. However, the present disclosure is not limited to being performed by any specific portion of the guest OS 216-1 and/or any specific process that is executed within the guest OS 216-1. Although in the example of FIG. 5, the process 500 is performed by the guest OS 216-1, it will be understood that the process 500 may be performed by any of the nodes identified at step 406 of the process 400. Furthermore, it will be understood that the present disclosure is not limited to any specific entity performing the process 500.

At step 502, the agent 304-1 receives the mount instruction that is transmitted during one of the iterations of step 410 of process 400. As noted above, the mount instruction instructs the agent 304-1 to mount an unspecified partition from the set created at step 402, without explicitly stating which one. Specifically, according to the present example, the mount instruction includes a partition set identifier (e.g., CLND_RES) as a parameter.

At step 504, the agent 304-1 retrieves from a memory of the guest operating system 216-1 (or storage processor 112 executing the guest OS 216-1) an identifier of the guest operating system.

At step 506, the agent 304-1 generates a partition identifier based on: (i) the partition set identifier that is submitted with the mount instruction (received at step 502), and (ii) and the node identifier that is retrieved independently of the mount instruction at step 504. According to the present example, the partition identifier is generated by concatenating the partition set identifier and the node identifier. However, the present disclosure is not limited to any specific method for combining the partition set identifier and the node identifier to generate a partition identifier.

At step 508, the agent 304-1 mounts the storage partition that is identified by the identifier derived at step 506. In implementations in which the guest-operating system 216-1 is Linux-based, the storage partition may be mounted by executing the "mount" command based on the partition identifier that is derived at step 506 and/or by calling an API that implements the mount command using the partition identifier as a parameter for the API call.

According to aspects of the disclosure, the clone command (detected at step 404 of process 400) may include most of the same parameters as a conventional mount command (i.e., a mount command that is available on most Linux-based operating systems). Such parameters may include a mount point identifier, a file system identifier, a run-filesystem-check identifier, a monitor interval identifier, etc. However, unlike a conventional mount command, the clone command includes, as a parameter, a partition set identifier, rather than a specific partition identifier. In other words, in contrast to clone commands, conventional mount commands include, as a parameter, a partition identifier rather than the identifier of an entire set of partitions. Furthermore, unlike conventional mount commands, the clone commands instruct the entity executing the clone command to disseminate the parameters of the clone command to different nodes in a clustered system, along with an instruction to mount an unspecified partition. By contrast, conventional mount commands result in the mounting of a partition, they do not result in the entity executing those commands reaching out to different nodes in a clustered system.

The instruction/command transmitted at step 410 of process 400 may be thought of as an "extended mount command". Similar to conventional mount commands, the "extended mount command" results in a partition being mounted. Unlikely conventional mount commands, however, the extended mount command does not include an identifier of the partition that ends up being mounted as one of its parameters. Rather, the extended mount command includes an identifier of a partition set, which the mounted partition is part of. Executing the extended mount command involves, processing the partition set identifier to derive a partition identifier, and subsequently using the partition identifier to mount the partition (the mounting of the partition based on the partition identifier may be performed in a well-known fashion). Other than that, the extended mount command may include the same parameters as a regular mount command. In instances in which the extended mount command has the same opcode or name as the conventional mount command (e.g., mount), the name/opcode may be followed by an additional flag that indicates whether the parameter of the mount command that corresponds to the device that is desired to be mounted is a partition set identifier or an individual partition. However, it will be understood that the extended mount command may use a different name or opcode as the conventional mount command. The term "extended mount command" is merely used to signal that the command transmitted at step 410 may bear some similarities (in function or syntax) to a regular mount command.

In Linux-based operating systems, the conventional mount command may be implemented in a file system resource agent. The extended mount command may be implemented by extending the file system source agent. The file system resource agent may be extended by including in its code, such as the code 700, which is discussed further below with respect to FIG. 7. This code may be arranged to derive a partition identifier from: (i) an identifier of a partition set which the partition is part of, and (ii) an identifier of the guest operating system or node that is executing the file system agent. After the partition identifier is generated, the code may be passed to portions of the file system resource agent, which are configured to execute conventional mount commands.

Each of the extended mount commands generated in one of the iterations of step 410 may be transmitted to a different file resource agent that is executing in a different node (e.g., a different agent 304 that is executing in one of guest operating systems 216). The extended mount command transmitted in any iteration of step 410 may include some or all of the parameters that are included in the clone command (detected at step 404). Items 626-646, which are shown in FIG. 6, are examples of parameters that can be received with the clone command. Any of the extended mount commands transmitted at step 410 may include one or all of items 626-646 as its own parameter. In other words, in one respect, FIGS. 4 and 5 show an example in which parameters received with a clone command for a particular partition set are channeled to different nodes where individual members of the partition set would be mounted.

As noted above, in one example, the extended mount transmitted at step 410 and received at step 502 may include a mount point identifier (e.g., "/clnd_res") as one of its parameters, in addition to a partition set identifier. The mount point identifier may be received as one of the parameters of the clone command (detected at step 402). The mount point identifier may be a directory path. In this regard, the clone command may cause each storage partition in a partition set to be mounted in a subdirectory bearing the same name. This is advantageous because cloned instances of the same application are likely to use identical configuration settings, so they may be arranged to use the same file path (relative to root) for their data storage needs.

FIG. 6 shows a sequence of commands that implement a variation of the process 400, which is discussed above with respect to FIG. 4. Although, in the example of FIG. 6, the instructions are command line instructions, it will be understood that alternative implementations are possible in which the instructions are embedded in an automated script.

At line 602, a configuration utility that is running on management system 117 is started. In the example of FIG. 6, the configuration utility includes a command line tool called CRM that is running on the management system 117 and configured to perform cluster configuration and management.

At line 604, a primitive PartitionMNT_Res is created. Item 622 is the name of the primitive, and items 624-634 are different parameters that are encapsulated or otherwise included in the primitive. Specifically, item 624 is a parameter that specifies a partition set identifier (i.e., CLND_RES), item 626 specifies a mount point, item 628 specifies a type of file system, item 630 specifies additional options for mounting the device as read-only, read-write or apply access control lists (acls), item 632 creates a monitoring operation that would be performed every 30 seconds, and item 634 specifies timeout parameters. In one respect, the mount point specified by item 626 specifies a directory where storage partitions in the set specified by item 624 would be mounted. The directory path specified at line 604 is relative to the root of the node where the storage partition is mounted. So, if the partition set includes two storage partitions, the first storage partition may be mounted at mount point/clnd_res in the root directory of a first node, and the second storage partition may be mounted at mount point/clnd_res in the root directory of a second node.

Line 606 creates a group including the primitive created at line 604. In the example of FIG. 6, the group includes only the primitive created at line 604. However, alternative implementations are provided in which the group includes multiple primitives. Line 606 is provided to illustrate that multiple primitives can be batched together for increased efficiency.

Line 608 invokes the clone command. The clone command invoked at line 608 may be the same or similar to the clone command detected at step 404 of process 400. Line 608, provides an example, in which the clone command receives as a parameter a group of primitives. However, alternative implementations are possible in which the clone command directly receives as a parameter the primitive created at line 602. Furthermore, alternative implementations are possible in which the clone command directly receives as parameters items 624-632 which are used to define the primitive at line 604.

Line 610 quits the crm utility that is started at line 602. Line 612 asks the user to confirm the changes made with lines 604-608 before those changes are committed.

FIG. 7 is a diagram of code 700 that be used to implement operations 504-506 of process 500, according to one particular example. In some implementations, the code may be integrated in the agent 304-1 and/or any other file system resource agent in the storage array 110 (shown in FIG. 1). Line 702 obtains the host name of the guest OS 216 where the code 700 is executed (hereinafter "instant guest operating system"). Line 704 sets the value of partitionSetID to equal the partition set identifier, which is part of item 624 of FIG. 6. Variable OCF_RESKEY initially captures the entire contents of item 624 (i.e. "-L CLND_RES"). It will be recalled that the code 700 may be executed when an extended mount command is invoked. The extended mount command may include a partition set identifier as one of its parameters. In this regard, variable OCF_RESKEY may capture the contents of the string that specifies the partition identifier. The command awk '{print $2}' removes '-L' from the string to leave only 'CLND_RES' as the value of variable partitionSetID. At line 706, variable pattern is set to equal the partition set identifier. At line 708, the code 700 confirms that there exists a device (or device file) in the instant guest OS 216. If such a device does not exist, the code 700 returns without performing any further actions. On the other hand, if there exists a device that includes the partition set identifier in its name, lines 710 and 712 are executed. Line 710 sets variable OCF_RESKEY to equal the concatenation of the identifier of the guest operating system 216-1 (i.e., '1' in this example) and the value of partitionSetID. Line 712 sets variable OCF_RESKEY to equal the concatenation of the identifier of the guest operating system 216-3 (i.e., '2' in this example) and the value of partitionSetID. In other words, if the code 700 is executing on guest operating system 216-1 (or by agent 304-1), the code 700 will derive a partition identifier by appending '1' to the partition set identifier (i.e., to variable partitionSetID). On the other hand, if the code 700 is executing on guest operating system 216-3 (or by agent 304-3),), the code 700 will derive a partition identifier by appending '2' to the partition set identifier (i.e., to variable partitionSetID). In the example of FIG. 7, '1' is an identifier corresponding to guest operating system 216-1 and '2' is an identifier corresponding to guest operating system 216-3. Both identifiers are linked to the operating systems' host names. In the example of FIG. 7, "host1" is the host name of guest OS 216-1 and "host2" is the host name of guest OS 216-3.

As noted above, the code 700 may be used to configure conventional file system resource agents to execute extended mount commands. By way of example, the extended mount command may have the format "mount -t btrfs -L<Dev_label> -o <mount_options> <mount_point>" (e.g., mount -t btrfs -L CLND_RES -o acl/clnd_res). When the mount command is executed, variable OCF_RESKEY is set to equal device_name". Variable OCF_RESKEY may either take a device name (e.g., /dev/sda1 or/dev/nvme0np1) or a label name for the device (e.g., -L <device_label_name>)), when the prefix '-L' is present. The presence of the string (or flag) "CLND" in the label name is an indication that the label name is a partition set identifier and that the mount is for a cloned resource, which in turn requires the file system resource agent performing the mount to append the host/ node identifier to the label name in order to derive the right name for the storage device that needs to be mounted. The code 700 should be executed to convert the value of OCF_RESKEY to a device name, before the mounting operation can proceed in a well-known fashion (i.e., as a conventional mount command).

Figure 8:
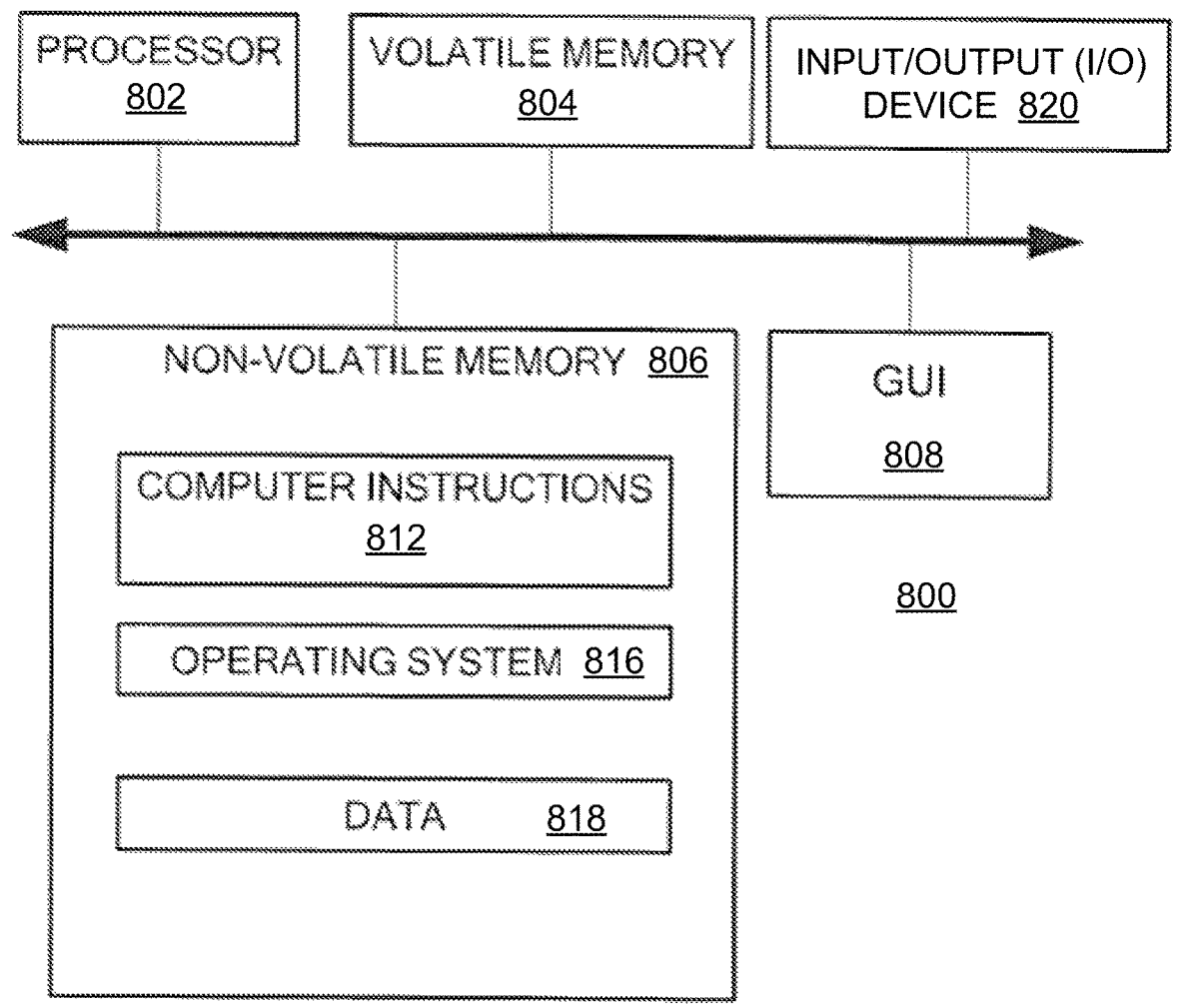
FIG. 8 is a diagram of an example of a computing device, according to aspects of the disclosure.

Referring to FIG. 8, in some embodiments, a computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from I/O device 820.

FIGS. 1-8 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-8 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The phrase "memory space of a guest operating system" may refer to volatile or non-volatile memory which the guest operating system (or applications running within the guest operating system) is allowed to access.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
creating a first storage partition having a first partition identifier, the first partition identifier including a partition set identifier and a first node identifier, the first node identifier being associated with a first node;
creating a second storage partition having a second partition identifier, the second partition identifier including the partition set identifier and a second node identifier, the second node identifier being associated with a second node;
detecting a type-1 command that includes the partition set identifier;
executing the type-1 command based on the partition set identifier, wherein executing the type-1 command includes: (i) transmitting to the first node a first instruction to mount an unspecified partition, the first instruction including the partition set identifier as a parameter, and (ii) transmitting to the second node a second instruction to mount an unspecified partition, the second instruction including the partition set identifier as a parameter;
in response to the first instruction, mounting the first storage partition at the first node, the mounting of the first storage partition being performed by: retrieving the first node identifier from a memory of the first node, combining the retrieved first node identifier with the partition set identifier to produce a first resulting identifier, and invoking, by the first node, a type-2 command based on the first resulting identifier; and
in response to the second instruction, mounting the second storage partition at the second node, the mounting of the second storage partition being performed by: retrieving the second node identifier from a memory of the second node, combining the retrieved second node identifier with the partition set identifier to produce a second resulting identifier, and invoking, by the second node, the type-2 command based on the second resulting identifier.

2. The method of claim 1, wherein the first node and the second node are part of a multi-node computing system, the first node identifier uniquely identifies the first node among all nodes in the multi-node computing system, and the second node identifier uniquely identifies the second node among all nodes in the multi-node computing system.

3. The method of claim 1, wherein the type-1 command includes a clone command, and the type-2 command includes a mount command.

4. The method of claim 1, wherein the first resulting identifier is the same as the first partition identifier and the second resulting identifier is the same as the second partition identifier.

5. The method of claim 1, wherein:
the first instruction is transmitted to a first file system resource agent that is executing on the first node;
the second instruction is tr to a second file system resource agent that is executing on the second node;
the first storage partition is mounted on the first node by the first file system resource agent; and
the second storage partition is mounted on the second node by the second file system resource agent.

6. The method of claim 1, further comprising defining a primitive that includes the partition set identifier and a directory path, wherein:
the type-1 command is executed based on the primitive, and
executing the type-1 command further includes forwarding the directory path to the first node and the second node;
the first storage partition is mounted, at the first node, at a first mount point that is identified by the directory path; and
the second storage partition is mounted, at the second node, at a second mount point that is identified by the directory path.

7. The method of claim 6, wherein the first storage partition and the second storage partition are used by a first instance of a cloned application and a second instance of the cloned application, respectively, the first instance being executed on the first node and the second instance being executed on the second node.

8. A method comprising:
receiving, at a computing node, an instruction to mount an unspecified storage partition, the instruction including a first parameter and a second parameter, the first parameter being a partition set identifier and the second parameter being a directory path;
retrieving, by the computing node, an identifier of the computing node;
combining the partition set identifier with the identifier of the computing node to derive a partition identifier, the partition identifier corresponding to a given storage partition;
mounting the given storage partition at the computing node, the given storage partition being mounted by using the derived partition identifier, the given storage partition being mounted at a mountpoint that is identified by the directory path.

9. The method of claim 8, wherein partition set includes a plurality of storage partitions, each storage partition being designated for use by a different instance of a cloned application.

10. The method of claim 8, wherein the computing node is part of a multi-device computing system, and the identifier of the computing node is unique among all nodes that are part of the multi-device computing system.

11. The method of claim 8, wherein the identifier of the computing node is a host device name.

12. The method of claim 8, wherein the combining of the partition set identifier with the identifier of the computing node is performed by a filesystem resource agent, and the mounting of the given storage partition is performed by executing a mount command that is implemented by the filesystem resource agent.

13. The method of claim 8, wherein the computing node is a storage processor in a storage system and the storage partition is used for storing data that is generated and used internally in the storage system.

14. The method of claim 8, wherein the first parameter and the second parameter are encapsulated in a primitive that is submitted as part of the instruction.

15. A computing device comprising:
a memory; and
at least one processor that is operatively coupled to the memory, the at least one processor being configured to perform the operations of:
receiving an instruction to mount an unspecified storage partition, the instruction including a first parameter and a second parameter, the first parameter being a partition set identifier and the second parameter being a directory path;
retrieving, from the memory, an identifier of the computing node;
combining the partition set identifier with the identifier of the computing node to derive a partition identifier, the partition identifier corresponding to a given storage partition;
mounting the given storage partition, the given storage partition being mounted by using the derived partition identifier, the given storage partition being mounted at a mountpoint that is identified by the directory path.

16. The computing device of claim 15, wherein partition set includes a plurality of storage partitions, each storage partition being designated for use by a different instance of a cloned application.

17. The computing device of claim 15, wherein the computing node is part of a multi-node computing system, and the identifier is unique among all nodes that are part of the multi-node computing system.

18. The computing device of claim 15, wherein the identifier of the computing node is a host device name.

19. The computing device of claim 15, wherein the combining of the partition set identifier with the identifier of the computing node is performed by a filesystem resource agent, and the mounting of the given storage partition is performed by executing a mount command that is implemented by the filesystem resource agent.

20. The computing device of claim 15, wherein the storage partition is used for storing data that is generated and used internally in a storage system.

* * * * *